United States Patent
Shiuan et al.

(10) Patent No.: US 8,730,230 B2
(45) Date of Patent: May 20, 2014

(54) CONTINUOUS GRAPHICS DISPLAY METHOD FOR MULTIPLE DISPLAY DEVICES DURING THE PROCESSOR NON-RESPONDING PERIOD

(75) Inventors: Yi-Fang Michael Shiuan, Saratoga, CA (US); Xinwei Yang, Fremont, CA (US); Jinming Gu, Cupertino, CA (US); Iming Pai, San Jose, CA (US)

(73) Assignee: VIA Technologies, Inc., New Taipei (TW)

( * ) Notice: Subject to any disclaimer, the term of this patent is extended or adjusted under 35 U.S.C. 154(b) by 1293 days.

(21) Appl. No.: 10/640,349

(22) Filed: Aug. 12, 2003

(65) Prior Publication Data

US 2004/0075621 A1    Apr. 22, 2004

Related U.S. Application Data

(60) Provisional application No. 60/419,880, filed on Oct. 19, 2002.

(51) Int. Cl.
*G06F 3/038* (2013.01)

(52) U.S. Cl.
USPC ............................................ 345/213; 345/1.1

(58) Field of Classification Search
USPC ......... 345/1.1, 1.2, 1.3, 2.1, 2.2, 2.3, 3.1, 3.2, 345/3.3, 3.4, 204, 213, 541, 698, 699
See application file for complete search history.

(56) References Cited

U.S. PATENT DOCUMENTS

| | | | | |
|---|---|---|---|---|
| 4,296,930 A | * | 10/1981 | Frederiksen | 463/31 |
| 4,860,251 A | * | 8/1989 | Bizjak et al. | 345/556 |
| 5,488,385 A | * | 1/1996 | Singhal et al. | 345/3.1 |
| 5,586,333 A | * | 12/1996 | Choi et al. | 713/320 |
| 5,615,376 A | * | 3/1997 | Ranganathan | 713/322 |
| 5,724,104 A | * | 3/1998 | Eom | 348/569 |
| 5,861,879 A | * | 1/1999 | Shimizu et al. | 345/213 |
| 5,878,216 A | * | 3/1999 | Young et al. | 709/208 |
| 5,917,552 A | * | 6/1999 | Van Court | 348/558 |
| 5,964,881 A | * | 10/1999 | Thor | 713/501 |
| 5,969,728 A | * | 10/1999 | Dye et al. | 345/553 |
| 6,046,709 A | * | 4/2000 | Shelton et al. | 345/1.1 |
| 6,067,083 A | * | 5/2000 | Glen et al. | 345/213 |
| 6,081,752 A | * | 6/2000 | Benson et al. | 700/79 |
| 6,340,959 B1 | * | 1/2002 | Inamori | 345/3.1 |
| 6,473,078 B1 | * | 10/2002 | Ikonen et al. | 345/211 |
| 6,515,716 B1 | * | 2/2003 | Suzuki et al. | 348/730 |

(Continued)

FOREIGN PATENT DOCUMENTS

WO    WO 9807274 A1 * 2/1998 ............... H04N 7/01

*Primary Examiner* — Sumati Lefkowitz
*Assistant Examiner* — Joseph Fox
(74) *Attorney, Agent, or Firm* — J.C. Patents (57) ABSTRACT

The present invention provides an image/graphics data display mechanism for continuously displaying image/graphics data on multiple display devices of a computer that contains a system memory directly accessed by the computer's CPU during the CPU's power saving non-responding period, wherein there is provided sufficient system bandwidth, the mechanism of the present invention is independent on the resolution running on each display device and the number of display devices connected to the computer system. The mechanism provides two approaches to achieve continuous display of image/graphics data on multiple display devices computer system. In the first approach, a common clock source is used to coordinate display device horizontal synchronization signals, vertical synchronization signals, horizontal blank periods, and vertical blank periods. In the second approach, the mechanism has a control on the lengths and occurrences of the display device blank periods.

7 Claims, 10 Drawing Sheets

(56) References Cited

U.S. PATENT DOCUMENTS

| | | | |
|---|---|---|---|
| 6,593,930 B1* | 7/2003 | Sheaffer et al. | 345/531 |
| 6,654,021 B2* | 11/2003 | Wasserman et al. | 345/535 |
| 6,714,172 B2* | 3/2004 | Matsuzaki et al. | 345/1.1 |
| 6,784,881 B2* | 8/2004 | Wasserman et al. | 345/213 |
| 6,919,899 B2* | 7/2005 | Shiuan et al. | 345/530 |
| 6,938,176 B1* | 8/2005 | Alben et al. | 713/323 |
| 7,184,450 B1* | 2/2007 | Wolf et al. | 370/535 |
| 7,245,272 B2* | 7/2007 | Shiuan et al. | 345/2.2 |
| 7,634,668 B2* | 12/2009 | White et al. | 713/300 |
| 2002/0021274 A1* | 2/2002 | Koyama et al. | 345/98 |
| 2002/0067318 A1* | 6/2002 | Matsuzaki et al. | 345/1.1 |
| 2004/0075621 A1* | 4/2004 | Shiuan et al. | 345/1.1 |
| 2004/0075622 A1* | 4/2004 | Shiuan et al. | 345/1.1 |
| 2004/0075653 A1* | 4/2004 | Shiuan et al. | 345/204 |
| 2004/0255170 A1* | 12/2004 | Yang et al. | 713/300 |

\* cited by examiner

CONTINUOUS GRAPHICS DISPLAY METHOD FOR MULTIPLE DISPLAY DEVICES DURING THE PROCESSOR NON-RESPONDING PERIOD

CROSS-REFERENCE TO RELATED APPLICATION

This application claims the priority benefits of U.S. provisional application titled" "Uninterrupted Graphics Display During The Period of Adjusting Processor's Operating Frequency And Power" filed on Oct. 19, 2002, Ser. No. 60/419,880. All disclosure of this application is incorporated herein by reference.

BACKGROUND OF THE INVENTION

1. Field of the Invention

The present invention relates to a computer graphic display, and more particularly, to a method for continuously displaying graphics or video data during a non-responding period of a central processing unit (CPU). Herein, the graphics or video data are stored in a system memory that can only be accessed via a built-in memory controller inside the CPU.

2. Description of the Prior Art

The computer is one of the most popular tools that have been closely involved in human daily life. Almost all professions rely on the computer to make their work more efficient and easier. As the usage of computer grows even further, the need for a higher performance computer is likewise growing and getting bigger. More functions and more capacities are built into a single computer chip, and the clock speed of a central processing unit in a computer increases from the range of mega ($10^6$)/second to the range of giga ($10^9$)/second within few years. Not only the layout of computer hardware has become more complicated than before, but the coding of computer software application also has grown from millions of lines to billions of lines of code. The achievement of more functions, greater speed, and less power consumption presents a challenge for the designing of a modern computer.

Conflicts are usually found in saving computer power consumption while trying to maintain the computer performance. Higher processing speed and more complex calculation always mean more power consumption. However, not all computer applications require high processing speed and consume large system resources all the time. Dynamically adjusting system operating clock and system resources, thereby reducing system power consumption based on the needs of a computer application is a clever design to keep the system performance high and save the system power consumption at the same time. The present invention identifies a solution for providing a continuous image/graphics display on a multiple computer display devices system during a CPU power saving process. The following paragraphs first provide computer display background knowledge, illustrate some common computer system display architectures by examples, and then introduce computer power saving mechanisms and computer system display problems caused by the power saving mechanisms.

With graphic-intensive applications, high quality image data are required to be displayed correctly and with precision on a monitor device without any blinking, jittering, or delays. An amount of several megabytes image data needs to be dumped onto a monitor device per second to accomplish a continuous error free video-on-demand application. Such a graphic-intensive application can be a high-end computer-aided drafting (CAD) application, a multimedia game, MPEG (Moving Picture Experts Group) video play back, video conference, or one of many other real-time video applications. Typically, a graphic-intensive application contains a huge amount of image data that needs to be timely displayed onto a monitor device. Every complete screen of graphic information, known as a frame, has to be displayed precisely in time to avoid display blinking and jittering; as a result, the graphic processing mechanism needs to decode the image data fast enough. For instance, with a 640.times.480 pixels (horizontal.times.vertical), 32 bits true color, and 30 frames per second graphic application without compression, its image processor needs to process 36.864 megabytes image data per second to be able to display correctly. Moreover, as the typical resolution of a computer display has increased from 640.times.480 pixels to 800.times.600 pixels, 1024.times.768, 1280.times.1024, and beyond, and color information per pixel from 2 bits to 24 bits, 32 bits, and beyond, the processing speed and stability of a image processor also need to be increased multiplicatively.

Typically, to increase the image processing speed, a computer relies on a graphics processing unit, or a standalone graphics card (GFX, also known as a video card, graphic accelerator card, or a display adapter, etc.) to do graphics display on a monitor device. A graphics card usually contains a specialized processor or processors that are tailor-made for graphic rendering, and a set of memory ranging from one, two, four, eight, or sixteen megabytes and up, so that image frames can be stored in the graphics card. Thus, the set of memory installed in a graphic card is commonly known as a frame buffer.

Figure 1:
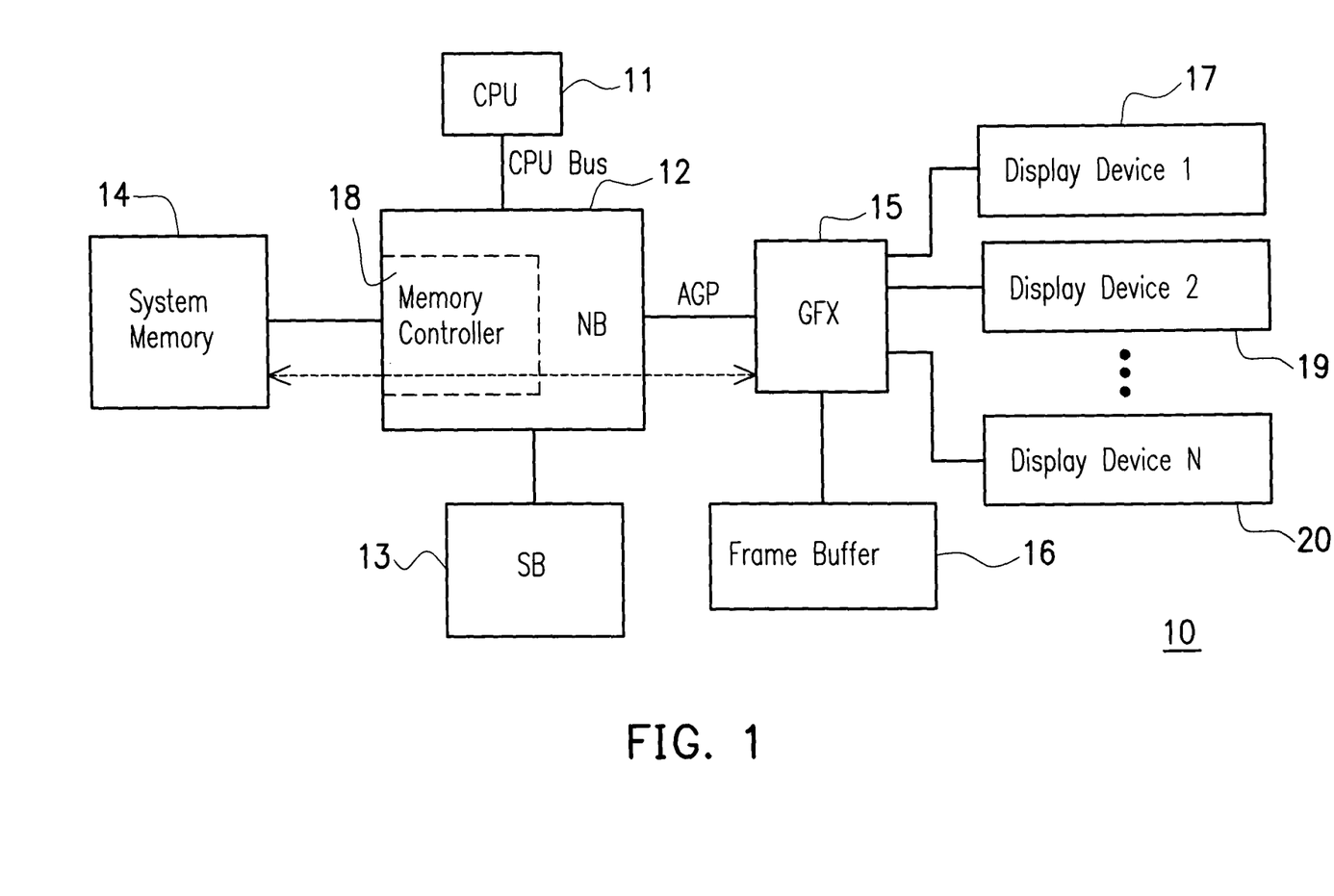
FIG. 1 is a block diagram depicting a conventional discrete computer system in which its graphic card (GFX) 15 is standalone from the system's North Bridge (NB) 12.
Figure 2:
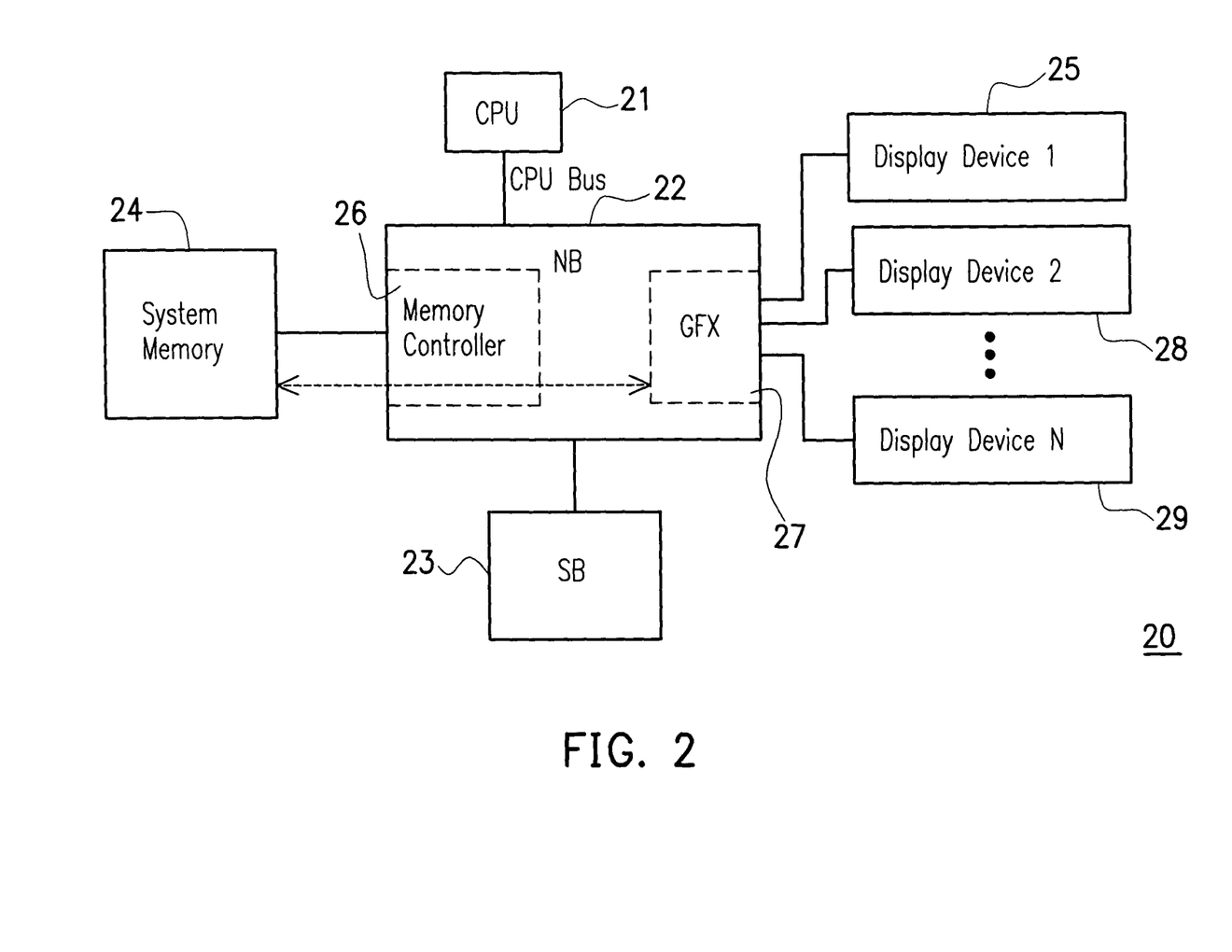
FIG. 2 is a block diagram that demonstrates a conventional on-chipset computer system in which its graphic processing unit (GFX) 27 is built inside the system's North Bridge (NB) 22.

A graphics card or a graphics-processing unit can be built into a standalone chipset as demonstrated in FIG. 1, or it can be integrated into an existing chipset as depicted in FIG. 2. Referring to FIG. 1, a computer system 10 comprises a CPU 11, a system chipset 12, a data-path chipset 13, a system memory 14, a graphics card (GFX) 15, a frame buffer 16, display devices 17, 19 and 20, and a built-in memory controller 18 inside the system chipset 12. The system chipset 12 is commonly referred to as North Bridge (NB), and the data-path chipset 13 is commonly referred to as South Bridge (SB). Each of the display devices can be a Cathode Ray Tube (CRT), a liquid crystal display (LCD), or any other advanced monitors. As a contrast to FIG. 1, in FIG. 2, a graphics-processing unit (GFX) 27 is integrated into the NB 22. And the placements of the CPU 21, the System Memory 24, the Memory Controller 26, the SB 23, the NB 22, and Display Devices 25, 28 and 29 are similar to FIG. 1.

Usually, graphics information that is going to be displayed onto the display device is first stored in the system memory, then transferred to a first-in-first-out (FIFO) buffer. A FIFO buffer display mechanism can make a request to access a system memory, and fill up its FIFO buffer with the graphic information. To a better explanation, the FIFO buffer display mechanism may be appreciated by a water tank analogy. Similar to water draining out from the bottom of a water tank at a constant rate and occasionally refilling from the top of the water tank, the FIFO display mechanism dumps image data to a display device at an invariant rate, and every so often receives image data from the system memory. Both the standalone graphics processing unit (as depicted in FIG. 1) and the on-chipset graphics processing unit (as depicted in FIG. 2) can directly access the system memory through the memory controller in the NB. In other words, the request of a system memory access can be made by the graphics processing unit (or the graphics card) without going through the CPU.

Figure 3:
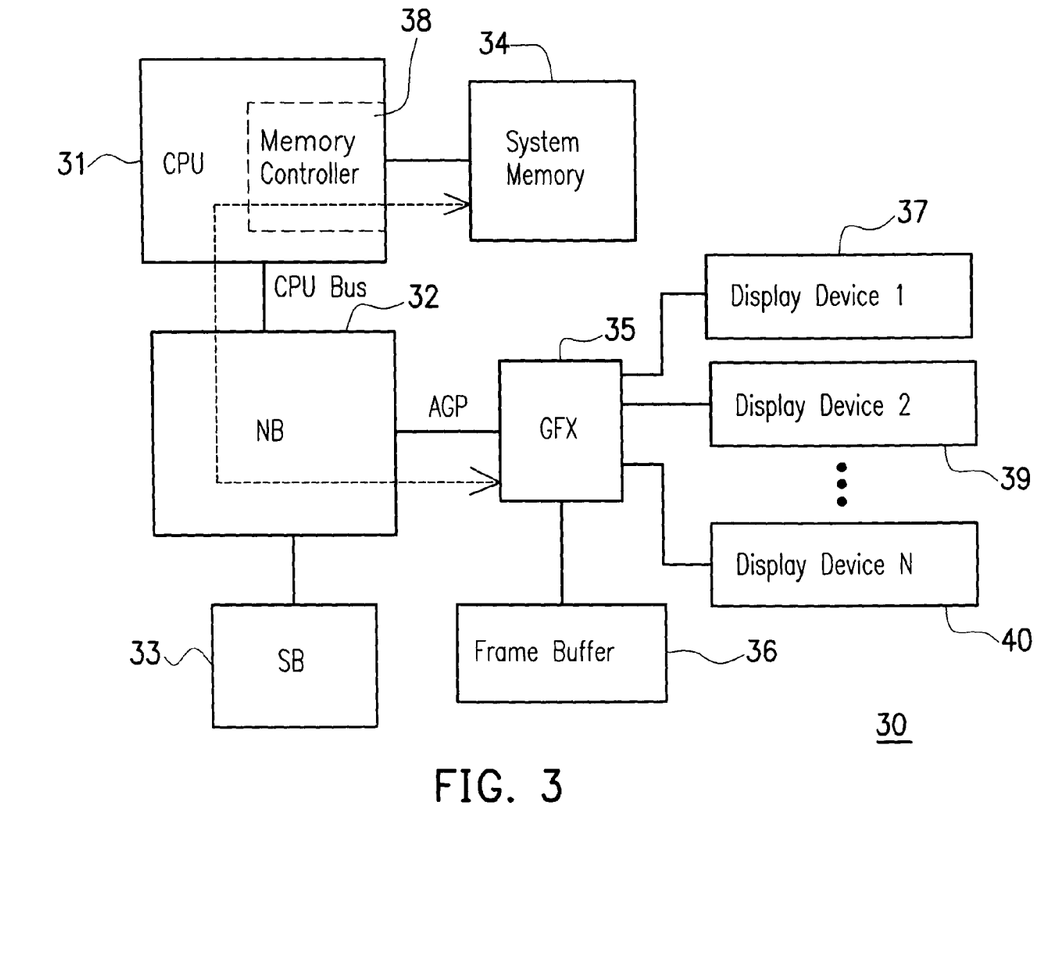
FIG. 3 is a block diagram showing a conventional computer system in which its graphics card is discrete from the system's North Bridge, and with the system's memory controller built inside the system CPU, the system memory is directly accessed by the system CPU.

In addition to the computer system architectures demonstrated in FIG. 1 and FIG. 2, there are other computer system architectures in use. For instance, two of those computer system architectures are presented in FIG. 3 and FIG. 4. In FIG. 3, a computer system architecture 30 is similar to the standalone GFX computer system 10 shown in FIG. 1 except that a system memory 34 is directly connected to a CPU 31 via a built-in memory controller 38. As the same in FIG. 4 and FIG. 2, both computer system architectures have their graphics processing units built into the North Bridges, but in FIG. 4, the memory controller 46 is inside the CPU 41 and the system memory 44 is directly coupled to the CPU 41 via the built-in memory controller 46. Note that with the computer system architectures sketched in FIG. 3 and FIG. 4, a system memory access requested by the graphics processing units (GFXs) has to go through not only the North Bridges but also the CPUs.

The increase of CPU work load often demands an increase in power consumption and results in a shorter battery life. The increased power consumption may cause a fatal problem to an application running on a mobile computer unit or a laptop computer. As a consequence, a variety of power saving techniques are introduced to the design of modern computers. A couple of power saving techniques are described as follows. When a CPU idles for a predetermined period of time, the CPU clock speed is reduced and the CPU power supply is turned off. Furthermore, instead of turning the CPU on and off, a mechanism that detects the power consumption level of an application several times every second and self-adjusts the CPU clock rate and power supply level to reduce power consumption is built into a computer. As a result, with the use of the power saving techniques, a battery can last longer and the capacity of a battery may be reduced to achieve the same performance.

Typically, a few microseconds (μsec) to tens of μsec is required to process the power saving mechanism. For instance, a range of ten μsec of time is needed to detect the power consumption level of an application, and adjusts the CPU clock rate accordingly. During the execution of power saving mechanism, the CPU is completely idle and waits for the next alternative CPU clock rate to operate. Upon the CPU idle period, the graphics card or the graphics processing unit presented in FIG. 3 and FIG. 4 cannot access the memory controller that is built inside the CPU to obtain the required image/graphics data from the system memory. The present invention provides a breakthrough solution to the conflict between power saving and continuous image/graphics data display in a modern computer design.

SUMMARY OF THE INVENTION

Accordingly, the purpose of the present invention is to provide a technique to continuously display graphics or video data on a multiple display devices computer system during a non-responding period of a CPU while executing a power saving process. This technique is particularly useful for a computer system that has its system memory controller built inside the CPU. Since the system memory controller and the system CPU are integrated together, a data transmission break will occur between the system memory and the graphics-processing unit due to the CPU falling into a non-responding period for power saving purposes or for other reason. With the present invention, a continuous graphics or video display on multiple display devices is guaranteed during the non-responding period of the CPU while executing the power saving process.

The present invention provides four different image data display mechanisms for continuously displaying image/graphics data on multiple display devices computer system that contains a system memory directly accessed by the computer's CPU during the non-responding period of the CPU. Note that there is no constraint on the resolution of each display device or on the number of display devices hooked up to the computer system, as long as the computer system has sufficient bandwidth for the display devices.

The procedure of the first mechanism of the present invention comprises: using the same clock source to synchronize vertical signals, horizontal signals, and blank periods of the display devices; waiting to receive a power saving process signal from the CPU, the power saving signal indicates a request for executing the power saving process by the CPU; and executing the power saving process within the least common multiple occurrence of the display device blank periods.

The procedure of the second mechanism of the present invention comprises: using the same clock source to synchronize vertical signals, horizontal signals, and blank periods of the display devices; waiting to receive a power saving process signal from the CPU; detecting an upcoming overlapping blank period of the display devices that is long enough for the power saving process to take place; and executing the power saving process within the overlapping blank period of the display devices.

The procedure of the third mechanism of the present invention comprises: detecting the number of display devices connected to the computer system; obtaining the length of a power saving process period (PSPP) of the computer system; waiting to receive a power saving process signal from the CPU; detecting an occurrence of the upcoming blank period for each display device; marking the last blank period occurrence of the display devices as a reference for executing the power saving process; extending the rest of the blank periods of the other display devices until all the display devices have an overlapping blank period that can hold the system power saving process period; and executing the power saving process within the overlapping blank period.

The procedure of the last mechanism of the present invention consists of: detecting the number of display devices connected to the computer system; obtaining the length of a power saving process period (PSPP) of the computer system; waiting to receive a power saving process signal from the CPU; detecting an occurrence of the upcoming blank period for each display device; marking the first blank period occurrence of the display devices as a reference for executing the power saving process; aligning the rest of the blank periods of the other display devices with the reference device blank period so that all the display devices have an overlapping blank period that can hold the system power saving process period; and executing the power saving process within the overlapping blank period.

The present invention successfully provides image data display mechanisms for continuously displaying image data on multiple display devices computer system that contains a system memory directly accessed by the computer's CPU during the CPU's non-responding period while executing the power saving process, wherein no constraints are held on the resolutions of the display devices or on the number of the display devices hooked up to the computer, providing that the bandwidth of the computer system is sufficient for all the display devices.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENT

Reference will now be made in detail to the present preferred embodiments of the invention, examples of which are illustrated in the accompanying drawings. Wherever possible, the same reference numbers are used in the drawings and the description to refer to the same or like parts.

In practice, a computer system has a limited system bandwidth to run more than one display device in high resolution at the same time. However, in a design of a modern computer, the system bandwidth may be big enough to support multiple display devices concurrently running in high-resolutions. To meet a possible future need and a complexity of the contemporary computer display infrastructure, the present invention provides an uninterrupted image/graphics display on a multiple display devices computer system during a non-responding period of a CPU while executing a power saving process, and without having any constraint on a resolution of each display device and on the number of display devices hooked up to the computer system. In the other words, the present invention does not depend on the system bandwidth or the number of display devices. As long as a system bandwidth is allowed, by using the present invention, a user can hook up as many display devices as desired and as higher display resolution as possible on each of the display devices to a computer system to have continuous display during the CPU non-responding period while executing the system power saving process.

The present invention provides two different approaches to resolve the continuously image/graphics display problem on multiple display devices during the power saving process. The first approach is to supply the display devices with the same clock source; the second approach is to adjust the occurrences of the display devices blank periods. Two preferred embodiments are provided for each of the approaches as demonstrated in the following paragraphs.

Figure 4:
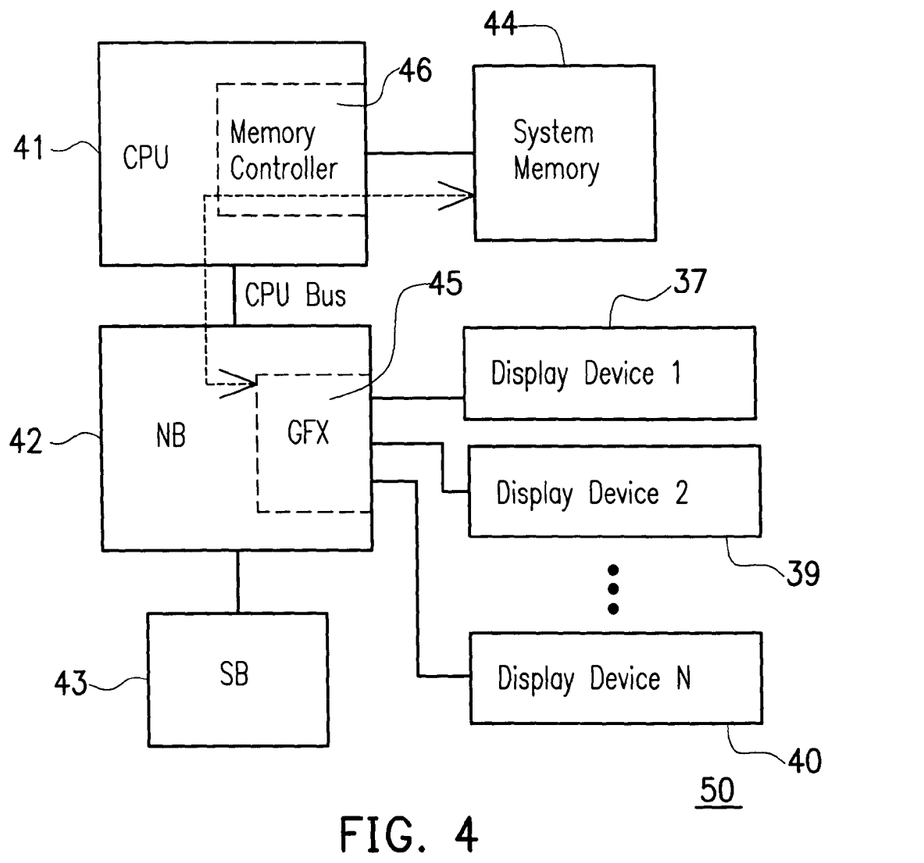
FIG. 4 is a block diagram sketching a compact computer system in which a system graphics processing unit is built inside the system North Bridge, and a system memory controller is inside a system CPU so that a system memory is directly accessed by the system CPU.
Figure 5:
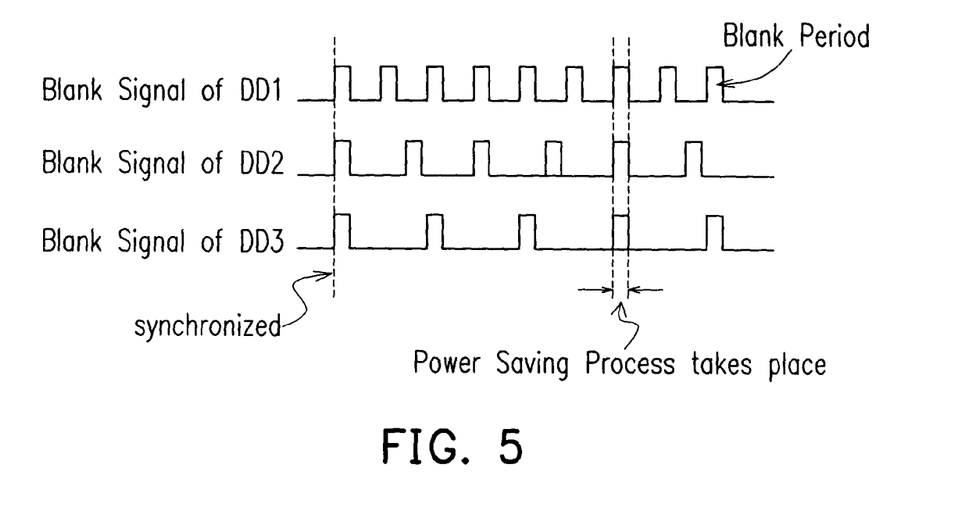
In FIG. 5, a timing diagram showing three display devices share the same clock source, and the three display devices are programmed to have simple fraction timing relationship, so that their blank periods are synchronized. For example in the FIG. 5, every 6 horizontal blank of DD (Display Device) 1 are corresponding to 4 horizontal blank of DD2 and 3 horizontal blank of DD3. Thereby, a least common multiple occurrence of display-device blank periods can be found periodically.

FIGS. 3, 4, 5, and 6 are used to demonstrate the first preferred embodiment of the present invention. The block diagrams in FIGS. 3 and 4 depict three display devices connected to computer systems. A hardware layout or a hardware design of a multiple-display devices computer system can vary from one to the other without loss its multiple-display functionality. Regardless a computer system's hardware layout, the present invention provides an image/graphics data display mechanism for continuously displaying image/graphics data on a multiple display devices computer system that contains a system memory directly accessed by the computer's CPU during the CPU non-responding period while executing the power saving process, wherein no constraint on a resolution of each display device or on the number of display devices hooked up to the computer system. For instance, the present invention can be utilized in a computer system presented in FIG. 3 or in FIG. 4 to have an uninterrupted image display during the CPU non-responding periods for power saving. The mechanism that the present invention provides works well in the case of a graphics-processing unit outside a system's North Bridge as depicted in FIG. 3, and it works equally well in the case of a graphics-processing unit inside a system's North Bridge as depicted in FIG. 4. Mainly, the present invention provides a solution to prevent an image/graphics data transmission break due to the execution of the power saving process in a multiple-display devices computer system that has the system memory directly accessed by the CPU. In a sense, the system CPU works like a bridge connecting the system memory and the graphics-processing unit (GFX) together. As the CPU falls into a non-responding period, the connection between the system memory and the graphics-processing unit breaks. Without being equipped with the present invention, the image/graphics data transmission breaks between the system memory and the graphics processing unit, therefore breaking the continuous image/graphics data display on the multiple display devices when the CPU falls into a non-responding period for power saving. Apparently, the hardware layout of a multiple-display devices computer system can vary along broad lines; so long as its system memory is directly accessed by its CPU and a system power saving process causes the system CPU to fall into a non-responding period, thereby breaking the image/graphics data transmission between the system memory and the graphics-processing unit. The present invention can thus provide a continuous image/graphics data display during the system power saving process of the multiple-display devices computer system.

Figure 6:
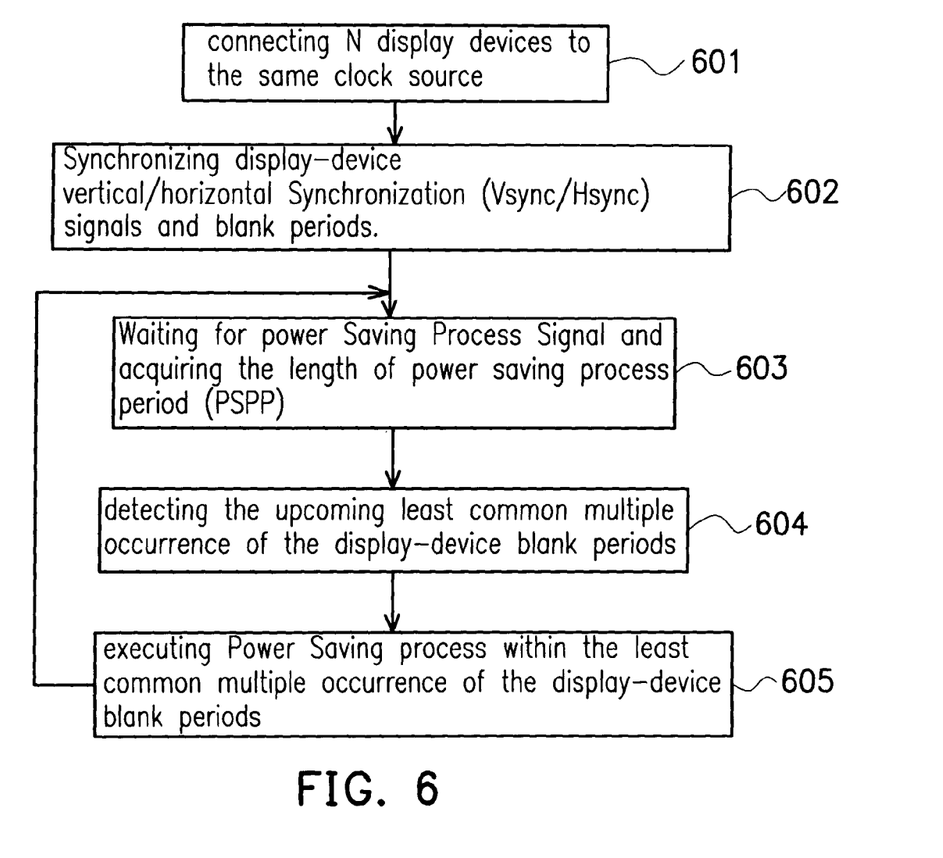
In FIG. 6, a flow chart diagram demonstrates an operation flow of a multi-display-devices continuous image/graphics data display mechanism of the present invention in which a least common multiple occurrence of display-device blank periods is detected and a power saving process is allowed to take place with in it.

As depicted in the block diagrams shown in FIG. 3 and FIG. 4, three display devices co-operating by the same clock source are connected to a computer system that contains a system memory directly accessed by the CPU. The three display devices may run in different refresh frequencies, thereby three different frequencies of display-device blank periods, and after the display devices has been stabilized, a least common multiple occurrence of the device blank periods can be found periodically as depicted in the timing diagram shown in FIG. 5. FIG. 6 that demonstrates the mechanism of the first preferred embodiment by a flow chart diagram. The mechanism first applies the same operation clock source to the display devices in step 601 and program the three display devices to have simple fraction timing relationship to synchronize their vertical signals, horizontal signals, and blank periods in step 602. Then, the mechanism waits to receive a power saving process signal that sends from the CPU and indicates a request for executing the power saving process by the CPU, and acquires the length of a power saving process period (PSPP) in step 603. During the PSPP, the CPU of the computer system idles to wait for a change of operating clock frequency, thereby the CPU falling into a non-responding period, and blocking the memory access from a graphics-processing unit to a system memory. Once the power saving process signal has been received and the length of the PSPP has been obtained, the mechanism detects the upcoming least common multiple occurrence of the display-device blank periods in step 604; and executes the power saving process within the least common multiple occurrence of the display-device blank periods in step 605. After the power saving process has finished, the mechanism goes back to the state of waiting to receive the next power saving process signal in step 603.

In the previous paragraph, the display-device periods can be a horizontal blank period (HBP) or a vertical blank period (VBP). So long as the length of HBP or VBP is longer than the length of the PSPP, the HBP or the VBP can be used to allow the power saving process to take place. In this context, the terms, PSPP, HBP, VBP, horizontal synchronization signal, and vertical synchronization signal, are signals that are used for synchronizing display devices, and they are commonly understood by those of ordinary skill in the art. For instance, the horizontal synchronization signal is a signal given to the display device telling it to stop drawing the current horizontal line, and start drawing the next line. The vertical synchronization signal is a signal given to the display device telling it to start tracing a new frame from the upper-left corner (for CRT monitors only) of the display screen. The horizontal blank period is the period of time required to start a new line. The vertical blank period is the period of time required to start a new frame.

Figure 7:
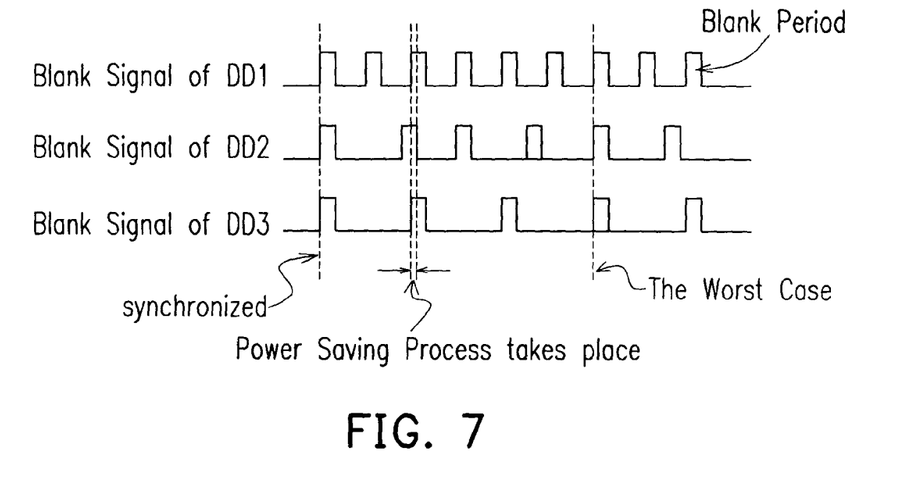
In FIG. 7, a timing diagram showing a common clock source is applied to three display devices as the same in FIG. 5. Thereby, the blank periods of the display devices are synchronized by the clock source. An overlap of the blank periods is found before a least common multiple occurrence of the blank periods occur. Once the overlapping part of the blank periods is long enough to hold a power saving process period, a power saving process can be taken place within the overlap.
Figure 8:
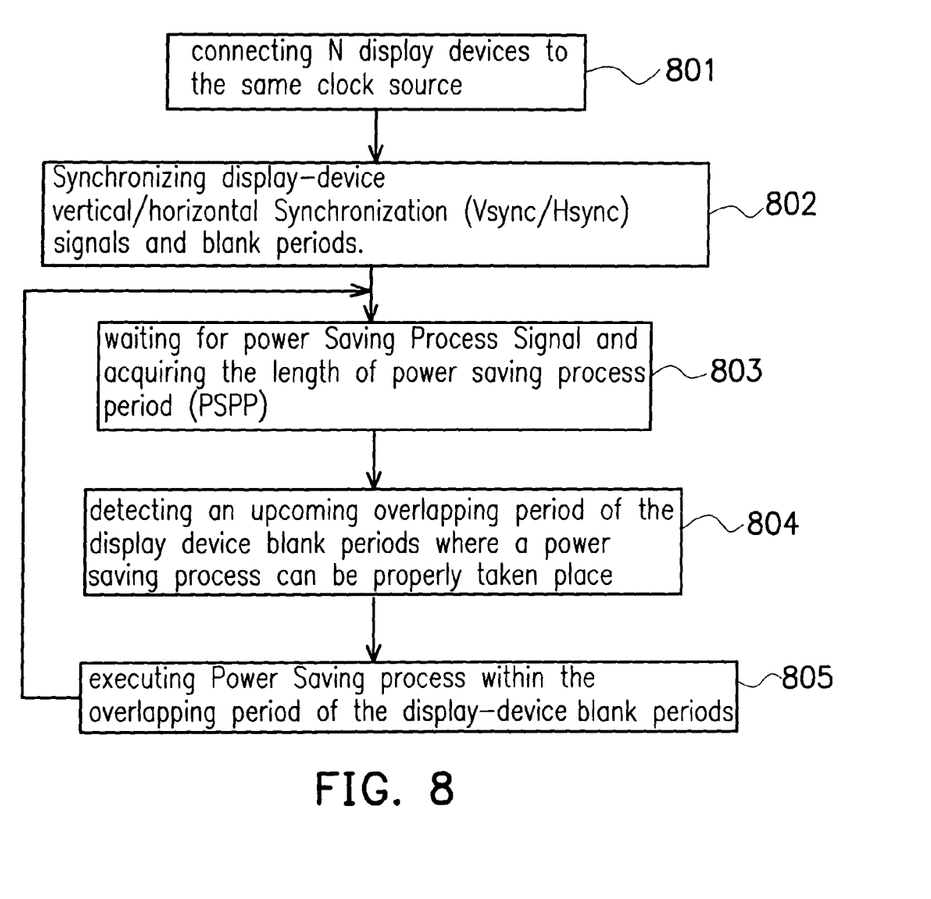
In FIG. 8, a flow chart diagram demonstrates another operation flow of a multi-display-devices continuous image/graphics data display mechanism of the present invention.

The second preferred embodiment of the present invention is similar to the first preferred embodiment except that instead of detecting a least common multiple occurrence of display-device blank periods, an overlapping of the display-device blank periods is located where a power saving process can be properly executed. FIG. 7 and FIG. 8 depict the mechanism. In FIG. 7, a timing diagram showing three display devices connected to a computer system, the three display devices are activated by the same clock source. Before a least common multiple occurrence of device blank periods occurs, an overlapping of the display device blank periods is detected by the mechanism of the present invention where a power saving process can be properly taken place. In FIG. 8, a flow chart diagram further describes the mechanism of the second preferred embodiment of the present invention in detail. First, providing sufficient system bandwidth, N display devices are connected to a computer system, and the N display devices are activated by the same clock source, in step 801. Some time after, the N display devices are stabilized, and their vertical signals, horizontal signals, and blank periods are synchronized in step 802. Afterwards, the mechanism of the present invention waits to receive a power saving process signal and acquires the length of a power saving process period (PSPP) in step 803. As the time goes by, the mechanism watches every blank period of the display devices, and looks for a possible overlapping period of the blank periods in step 804. Once a long enough overlapping period that is longer than or equal to the length of PSPP is found, a power saving process is allowed to take place within that overlapping period in step 805. Note that if no sufficient overlapping period can be found, the worst case is to execute the power saving process in the upcoming least common multiple occurrence of the display device blank periods as depicts in FIG. 7. After the power saving process has finished, the mechanism goes back to the state of waiting to receive the next power saving process signal in step 803.

Figure 9:
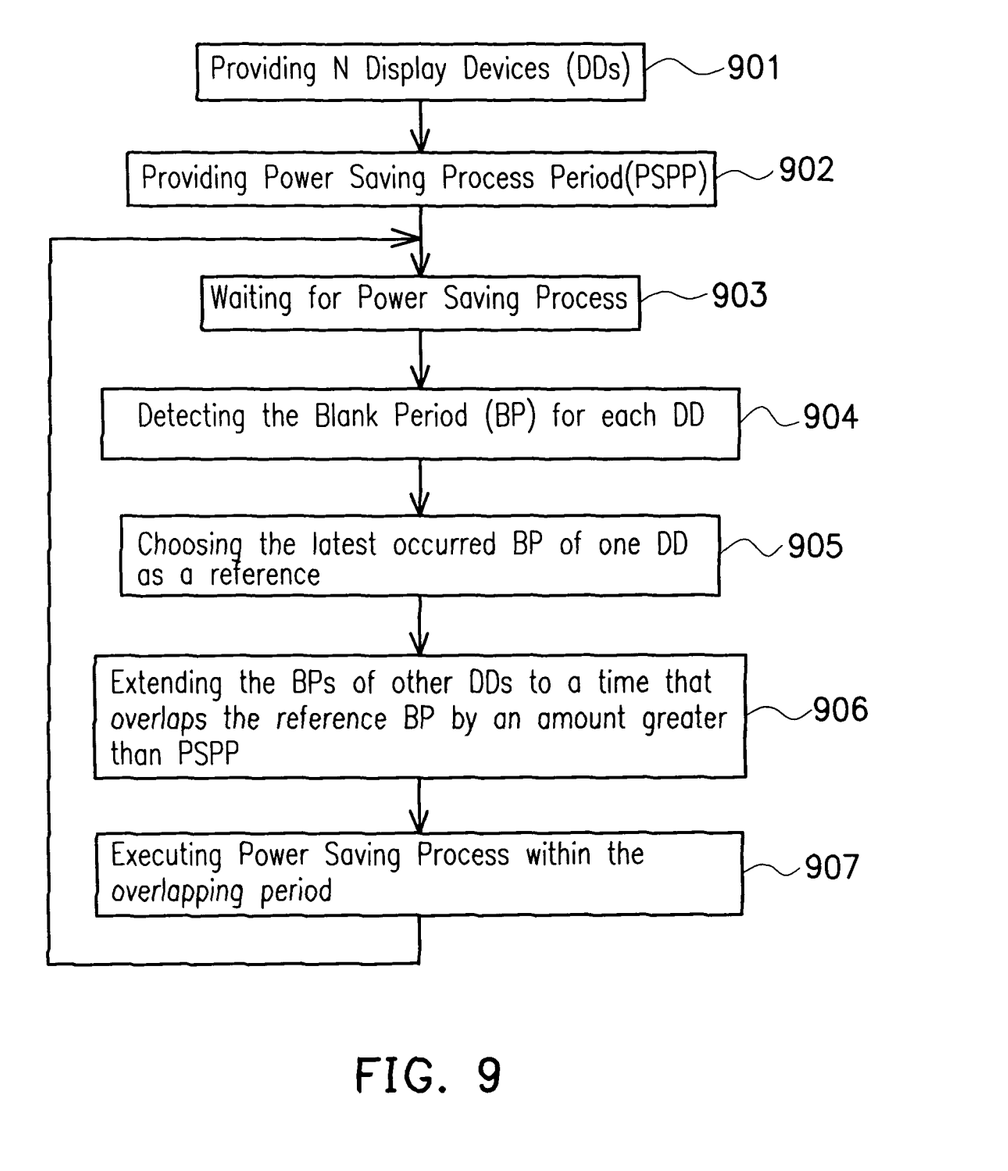
In FIG. 9, a flow chart diagram demonstrates the operation flow of the third preferred embodiment of the present invention.
Figure 10:
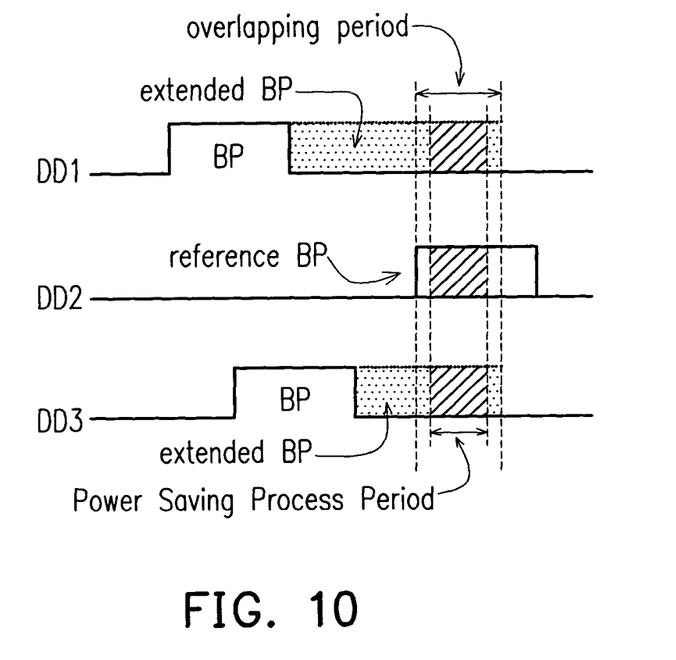
In FIG. 10, a timing diagram showing three display device blank periods, DD1, DD2, and DD3, are extended based on the reference blank period DD2 to have a concurrent overlapping blank period as depicted for a power saving process to take place.

The second approach of the present invention to have continuous display on a multiple display devices computer system during a power saving process is depicted in FIG. 9 and FIG. 10. Instead of establishing a common clock source for all display devices hooked up to the computer system, the second approach of the present invention provides a control signal to the display devices that effects the length and the occurrence of the display device blank periods.

In FIG. 9, a flow chart diagram illustrates the -mechanism of the third preferred embodiment of the present invention that properly extends display device blank periods to allow a power saving process to take place within the concurrent blank periods. First, providing sufficient system bandwidth, N display devices are connected to a computer system in step 901.

The mechanism acquires the length of a power saving process period (PSPP) in step 902. Then, the mechanism waits to receive a power saving process signal that sends from the CPU and indicates a request for executing the power saving process by the CPU (step 903). Upon receiving the power saving process signal, the mechanism detects an upcoming blank period for each display device in step 904. Three display device blank periods are depicted in FIG. 10. The mechanism marks the occurrence of the last occurring blank period of the display devices as a reference point, in step 905, to allow the power saving process to take place. Just for illustrating purpose, the blank period of display device 2 is the last occurring blank period which is used as the reference blank period. Then, in step 906, the mechanism extends the rest of the blank periods of the other display devices until all the display devices have an overlapping blank period that can hold the system power saving process period, and executes the power saving process within the overlapping blank period in step 907. After the power saving process is finished, the mechanism goes back to the state of waiting to receive the next power saving process signal in step 903.

Figure 11:
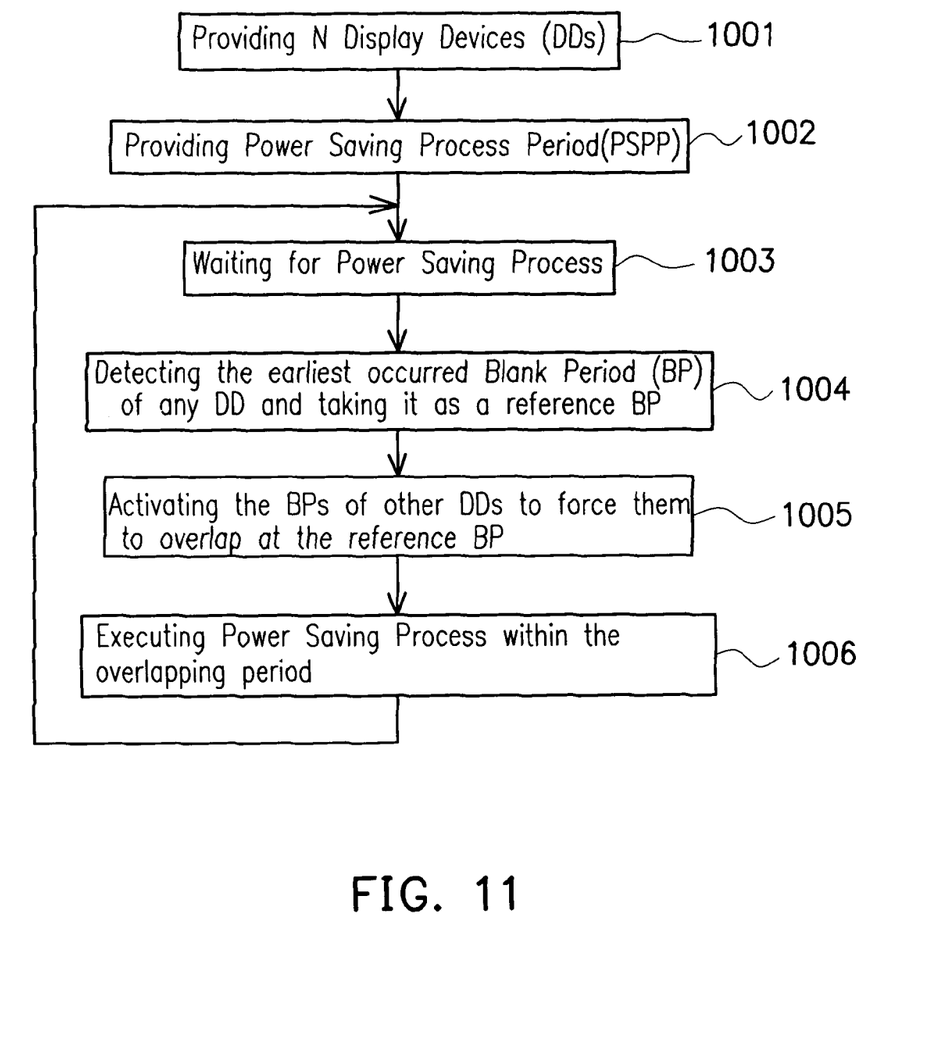
In FIG. 11, a flow chart diagram demonstrated the operation flow of the forth preferred embodiment of the present invention.
Figure 12:
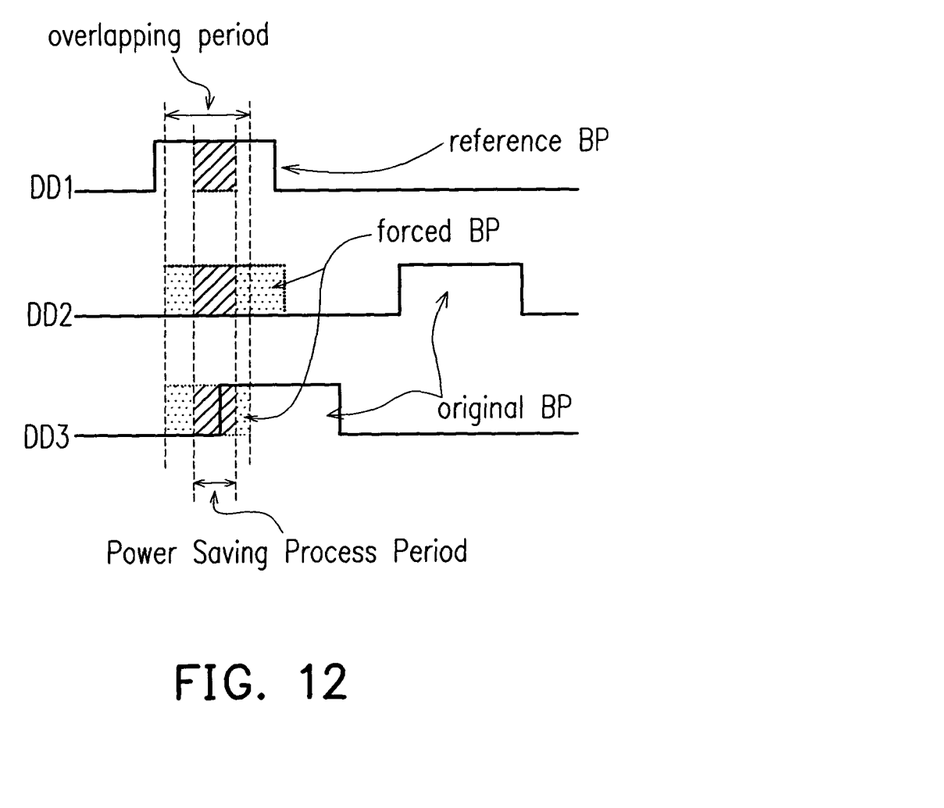
In FIG. 12, a timing diagram showing three display device blank periods, DD1, DD2, and DD3, are aligned based on the reference blank period DD1 to have a concurrent overlapping blank period as depicted for a power saving process to take place.

The last preferred embodiment of the present invention is similar to the previous preferred embodiment except that the mechanism moves the occurrences of the display device blank periods forward, and aligns the blank periods up to the first occurrence of the display device blank period to allow the power saving process to occur within the overlapping blank period. In FIG. 11, a flow chart diagram illustrates the mechanism of the present embodiment of the present invention that properly aligns display device blank periods forward to allow a power saving process to take place within the concurrent blank periods. First, providing sufficient system bandwidth, N display devices are connected to a computer system in step 1001. The mechanism acquires the length of a power saving process period (PSPP) in step 1002; then, it waits to receive a power saving process signal from the CPU in step 1003. Upon receiving the power saving process signal, the mechanism detects the earliest occurring blank period of any display device and takes it as a reference blank period, step 1004. Three display device blank periods are depicted in FIG. 12. The mechanism marks the first blank period occurrence, which is the blank period of display device 1, as the reference blank period. Then, in step 1005, the mechanism aligns the rest of the blank periods of the other display devices up to the reference blank period, by forcing the later occurring blank periods of other display devices to take place at around the time the reference blank period occurs, so that all the display devices have an overlapping blank period that can hold the system power saving process period. The mechanism executes the power saving process within the overlapping blank period in step 1006. Once the power saving process is finished, the mechanism goes back to the state of waiting to receive the next power saving process signal in step 1003.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A graphics display method for continuously displaying a plurality of graphics data on multiple display devices of a computer system that contains a central processing unit (CPU) which has a memory controller inside the CPU, a graphics-processing unit coupled to the memory controller, and a system memory directly accessed by the CPU, wherein the display devices are coupled to the graphics-processing unit, the method comprising:

provide a common clock source to the display devices and synchronizing a plurality of blank periods of the display devices according to the common clock source, the plurality of blank periods of the display devices are in different frequencies;

receiving a power saving signal from the CPU, the power saving signal indicates a request for executing a power saving process by the CPU during a non-responding period of the CPU, so as to reduce consumptive power of the CPU, wherein memory access from the graphics-processing unit to the system memory through memory controller is blocked during the non-responding period of the CPU;

detecting an upcoming least common multiple occurrence of the blank periods of the display devices; and executing the power saving process within the least common multiple occurrence, wherein the least common multiple occurrence is a period that the blank periods of all display devices occur at the same time.

2. The method of claim 1, wherein the blank periods are a plurality of horizontal blank periods (HBPs).

3. The method of claim 2, wherein the horizontal blank periods are provided by the graphics-processing unit.

4. The method of claim 1, wherein the blank periods are a plurality of vertical blank periods (VBPs).

5. The method of claim 4, wherein the vertical blank periods are provided by the graphics-processing unit.

6. A graphics display method for continuously displaying a plurality of graphics data on multiple display devices of a computer system that contains a central processing unit (CPU) which has a memory controller inside the CPU, a graphics-processing unit coupled to the memory controller, and a system memory directly accessed by the CPU, wherein the display devices are coupled to the graphics-processing unit, the method comprising:

providing a common clock source to the display devices and synchronizing a plurality of blank periods of the display devices according to the common clock source, the plurality of blank periods of the display devices are in different frequencies;

receiving a power saving signal from the CPU, the power saving signal indicates a request for executing a power saving process to make the CPU self-adjust a CPU-clock rate and a power level of the CPU during a non-responding period of the CPU, wherein memory access from the graphics-processing unit to the system memory through memory controller is blocked during the non-responding period of the CPU; detecting an upcoming least common multiple occurrence of the blank periods of the display devices; and executing the power saving process within the least common multiple occurrence, wherein the least common multiple occurrence is a period that the blank periods of all display devices occur at the same time.

7. The method of claim 6, wherein while executing the power saving process, the system memory is accessed by the CPU during the non-responding period of the CPU.

* * * * *